R. R. MILLER.
OPERATING DEVICE FOR AUTOMATIC SWITCHES.
APPLICATION FILED MAR. 21, 1908.
932,046.
Patented Aug. 24, 1909.
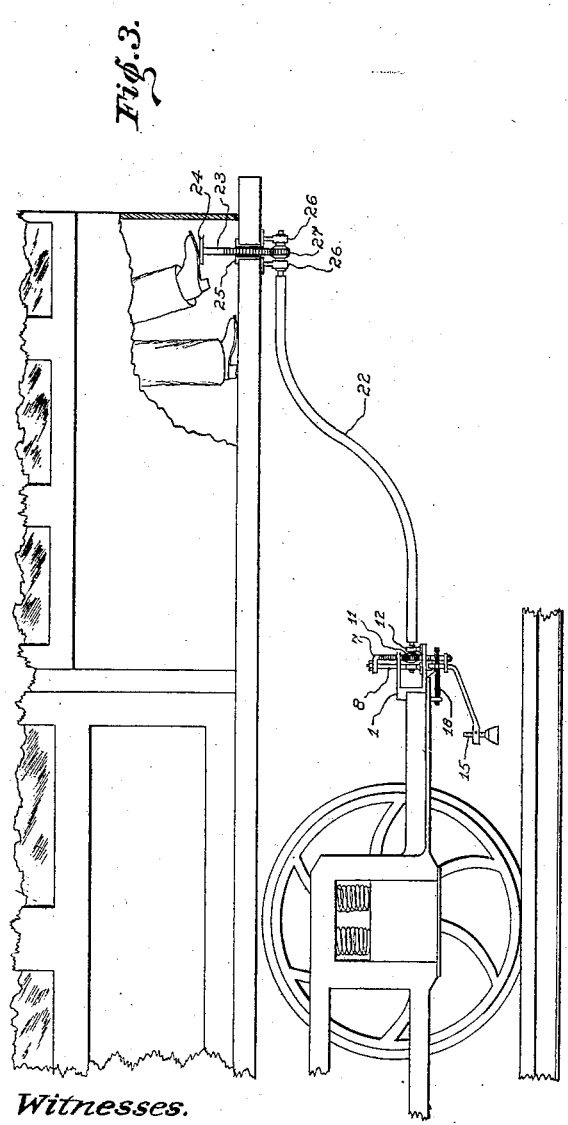
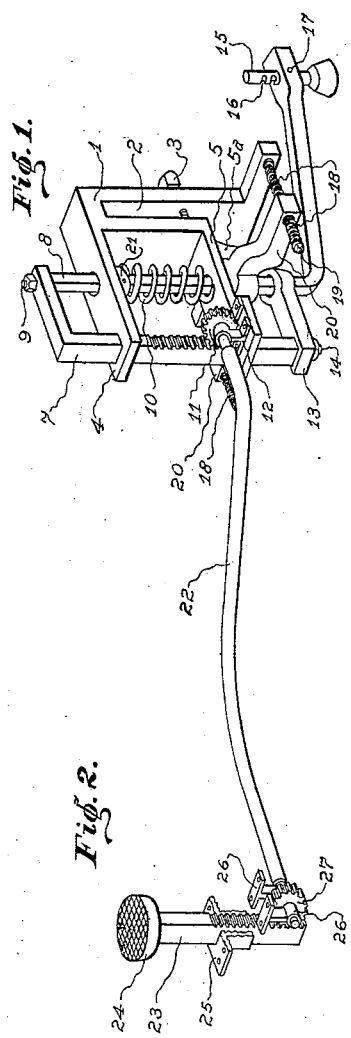
Witnesses.
D. A Calloway
Geo L Walker
Inventor.
Royal Rueben Miller
By Lyman L Henry
Attorney.

UNITED STATES PATENT OFFICE.

ROYAL RUEBEN MILLER, OF PUEBLO, COLORADO.

OPERATING DEVICE FOR AUTOMATIC SWITCHES.

932,046.

Specification of Letters Patent.    Patented Aug. 24, 1909.

Application filed March 21, 1908. Serial No. 422,473.

*To all whom it may concern:*

Be it known that I, ROYAL RUEBEN MILLER, a citizen of the United States, residing at Pueblo, in the county of Pueblo and State of Colorado, have invented a new and useful Operating Device for Automatic Switches, of which the following is a specification.

My invention relates to improvements in automatic switch operating devices in which a switching arm carrying a switching pin is operated by a flexible shaft carrying gears on each end thereof that mesh in racks, one of the racks being carried by the car bed is operated by foot pressure and the other carried by the car truck is operated through the agency of the gears and flexible shaft, and controls the movements of the switching arm and pin.

The objects of my invention are, first, to provide, in an operating device for automatic switches, a means of accommodating the movements of the car bed and trucks in turning curves, without interfering with the perfect operation of the switch operating mechanism; and, second, to provide for such accommodation by the use of parts that may be well fitted together so no lost motion is occasioned by loose fitting parts. I attain these objects by the mechanisms illustrated in the accompanying drawings in which—

Figure 1 is a perspective view of parts that are carried by the car truck. Fig. 2 is a perspective view of the parts carried by the car bed and is connected to Fig. 1 by a flexible shaft. Fig. 3 is a side elevation of a portion of the front end of a street car with my invention mounted thereon.

Similar reference numerals refer to similar parts throughout the several views.

Letters Patent for operating devices for automatic switches bearing date June 16, 1908, No. 890,784, have been issued to me in which is provided a foot operated piston connected by pipe with a spring piston, air compression being transmitted from the foot operated piston through hose and pipe to the spring piston, a spring centering head connected with the spring piston which head also carries a switch pin, and said centering head is attached to the shaft of the spring piston in a cross head and pivotally attached at the end opposite the switching pin to an extending element, the springs operating against the sides of the arm; but in this device I present certain improvements whereby the force of springs is more fully utilized, the horizontal adjustment of the arm carrying the switch pin is maintained and requisite strength obtained for the support of said arm so that the same works in the horizontal movements without clamping the device and the motive power of the device is supplied through foot power and gear wheels instead of compressed air.

My switch operating device being designed to operate switching mechanisms that are mounted on the ground in the middle of a railroad track must be mounted so as to follow the middle of the track as nearly as may be, and therefor the frame 1 is secured by set screw 3 to the truck frame that enters the opening 2 over the middle of the track so that switching pin 15, which is adjustable upwardly and downwardly by means of grooves 16 and pin 17, will be directly over the middle of the track, or centrally between the car wheels, the said pin is carried by arm 8 which is bent near its middle so the upper portion extends upward through elements 5 and 4 of frame 1 and is turnable therein. The uppermost end being held by a nut at 9 in rack 7 in which it is also turnable; the rack 7 carrying a distance piece 13 secured by nut 14 at its bottom through which arm 8 passes and in which said arm is turnable, rack 7 being slidable through holes in elements 4 and 5 of frame 1.

Arm 8 is bent backwardly below distance piece 13 and may be moved laterally in either direction from the central position shown in Fig. 1. The arm 8 is moved downwardly by rack 7 which meshes with gear 11 that is keyed to the shaft carried by bearings 12, the latter being secured to a portion of frame 1, said shaft is secured to the flexible shaft 22 which has another similar shaft secured to it at its other end that is rotatable in bearings 26 which are secured to the under side of the car floor and has keyed thereon the gear 27 meshing in rack 23 which passes upwardly through the floor of the car through guide 25 that is held to the car floor by screws and which serves to keep said rack in proper mesh with gear 27. The motorman pressing down on the knurled cap 24 communicates a rotary motion to gear 27, shaft 22 and gear 11 and a downward movement to rack 7 which carries with it arm 8; the proper downward movement of the switching arm and pin being accounted for by the adjustment of pin 15, so proper engagement with a switch mechanism on the ground, may be had. The racks 7 and 23 and arm 8 are returned to their former position by spring 10 which surrounds arm 8 and engages collar 21 that is secured to said arm. The switching arm 8 is operative to move laterally from a central position in either direction, and to return the same to a central position the centering arm 20 is provided, which has a square hole in its middle through which the arm 8 is slidable upward and downward but moves laterally with said centering arm, both being returned to a central position by springs 18 that are mounted on rods 19. At each end of arm 20 a spring 18 is held between an outwardly extending element on frame 1 and the arm, as well as between a washer at the end of the rods 19 and the arm in such manner that a lateral movement of the arm in either direction will compress a spring at each of its ends and when the pressure that moved the arm laterally is released the arm will return to a central position. Rods 19 pass loosely through holes in arm 20 and the outwardly extending elements on frame 1. Beneath the element 5 of frame 1 is a downwardly extending lug 5ª that carries the central outwardly curving portion of arm 20 so as to take a backward thrust of the arm, the said lug extending below and under the arm so as to hold it up, or from moving downwardly with arm 8.

From the foregoing it may be seen that a downward movement may be imparted to rack 7 and arm 8 by downward pressure at 24 and that the pin 15 on coming in contact with an actuating device or element on the ground may be carried around to either side from a central position and on passing the same, because of the arms and springs, the pin will be returned to its normal position, and also the arms and spring means afford accommodation in the event the switch actuating element does not move as intended, to avoid breaking the parts. By this arrangement the gears press the arm 8 downward until the pin 15 is brought into engagement with the device in the track and the arms extending laterally are held in relative position by the tension springs, while the lateral arms are slidable upon the upright portion of the operating arm so that any binding of the relative parts consequent upon the operation of my device covered by Letters Patent above specified is avoided, and greater power is obtained by gear means to operate this device instead of air compression as in my former device.

I claim:

1. In an operating device for automatic switches, the combination of a rack slidably mounted in the floor of a car, meshing with a gear on one end of a flexible shaft, a similar gear attached to the other end of said flexible shaft with last said gear meshing with a rack slidable in attachment to the truck of railroad car, and a switching arm adjustable in frame and carrying an adjustable switching pin, all substantially as described.

2. In an operating device for automatic switches, a switching arm carrying an adjustable switching pin, a lateral arm slidable on said switching arm and held in place by spring means, all substantially as set forth.

3. In an operating device for automatic switches a lateral centering arm slidable perpendicularly on a switching arm, a frame carrying said switching arm, spring means attached to arm on said frame operating on said lateral centering arm, all substantially as set forth.

In testimony whereof I have signed my name to this specification in the presence of two subscribing witnesses.

ROYAL RUEBEN MILLER.

Witnesses:
GEO. L. WALKER,
CASSIUS M. WALKER.